United States Patent [19]
Takaaki

[11] Patent Number: 5,990,755
[45] Date of Patent: Nov. 23, 1999

[54] PHASE MODULATOR EFFICIENTLY UTILIZING WAVEFORM STORING SECTION

[75] Inventor: Yashiro Takaaki, Gifu, Japan

[73] Assignee: Sanyo Electric Co., Ltd, Osaka, Japan

[21] Appl. No.: 09/068,118

[22] PCT Filed: Nov. 27, 1996

[86] PCT No.: PCT/JP96/03482

§ 371 Date: Jun. 2, 1998

§ 102(e) Date: Jun. 2, 1998

[87] PCT Pub. No.: WO97/20416

PCT Pub. Date: Jun. 6, 1997

[30] Foreign Application Priority Data

Nov. 28, 1995 [JP] Japan ................................. 7-309170

[51] Int. Cl.$^6$ ..................................................... H03C 3/00
[52] U.S. Cl. .......................... 332/103; 332/104; 375/308
[58] Field of Search ................................... 332/103, 104, 332/105; 375/261, 298, 308

[56] References Cited

U.S. PATENT DOCUMENTS

| | | |
|---|---|---|
| 4,680,777 | 7/1987 | Saha .................................... 375/53 |
| 4,910,474 | 3/1990 | Tjahjadi et al. ..................... 332/103 |
| 5,077,757 | 12/1991 | Cahill .................................. 375/59 |
| 5,175,514 | 12/1992 | Iinuma et al. ...................... 332/103 |

Primary Examiner—Benny Lee
Assistant Examiner—Henry Choe
Attorney, Agent, or Firm—Nikaido, Marmelstein, Murray & Oram LLP

[57] ABSTRACT

Ramp period detecting circuit 101 outputs signal Tc that indicates the start and end of the ramp period. Two-dimensional quadrature coordinates (Iα,Qα) and (Iβ,Qβ) are output alternately. Coordinate accumulator 106 accumulates Iα which is +1 or -1 corresponding to each odd piece of two-bit data; coordinate accumulator 107 accumulates Qα which is 0 corresponding to each even piece of two-bit data. Response waveforms from a digital lowpass filter (or rise/fall ramp waveforms) corresponding to signal Tc and outputs from coordinate accumulators 106 and 107, namely accumulated values of Iα and Qα, are alternately read from storage unit 112.

6 Claims, 10 Drawing Sheets

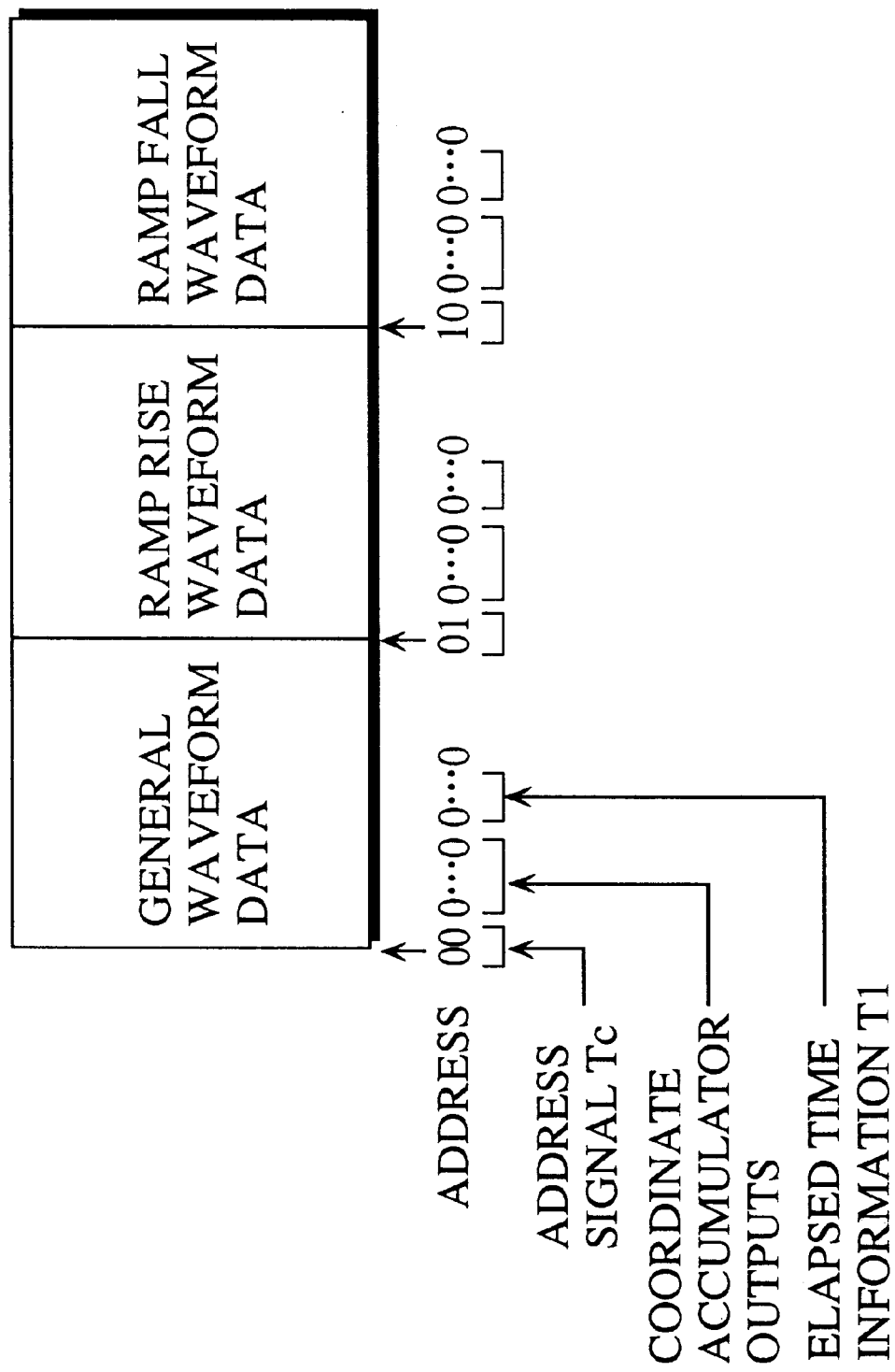

Fig. 7B

| WAVEFORM DATA | ADDRESS SIGNAL Tc |
|---|---|
| GENERAL | 00 |
| RAMP RISE | 01 |
| RAMP FALL | 10 |

PHASE MODULATOR EFFICIENTLY UTILIZING WAVEFORM STORING SECTION

FIELD OF THE INVENTION

This invention relates to a phase modulating apparatus for modulating digital baseband signals with the Quadrature Phase Shift Keying (QPSK).

BACKGROUND OF THE INVENTION

Currently, the QPSK is widely used as a digital modulation method. For example, RCR STD-28 standard for Personal Handyphone System (PHS) stipulates that the π/4-shift QPSK should be used as a modulation method. The QPSK including the π/4-shift QPSK is a modulation method in which two bits of data are transferred simultaneously by using the inphase (I-phase) component and quadrature-phase (Q-phase) component of a carrier wave.

Given below is the description of the π/4-shift QPSK and conventional π/4-shift QPSK modulating apparatus 600.

π4-shift QPSK modulating apparatus receives a baseband signal as serial data. The baseband signal is converted through series-to-parallel conversion into a symbol $(X_k,Y_k)$ which is a piece of two-bit parallel data, where "k" represents a natural number, indicating that "$(X_k,Y_k)$" is the k-th symbol. The symbol $(X_k,Y_k)$ is converted by a differential encoding circuit into a quadrature signal $(I_k,Q_k)$ This conversion is performed based on the following formula:

$$\begin{bmatrix} I_k \\ Q_k \end{bmatrix} = \begin{bmatrix} \cos[\Delta\phi(X_k, Y_k)] & \sin[\Delta\phi(X_k, Y_k)] \\ \sin[\Delta\phi(X_k, Y_k)] & \cos[\Delta\phi(X_k, Y_k)] \end{bmatrix} \begin{bmatrix} I_{k-1} \\ Q_{k-1} \end{bmatrix},$$

where $\Delta\phi(X_k,Y_k)$ has values shown in the following table:

TABLE 1

| $X_k$ | 1 | 0 | 0 | 1 |
|---|---|---|---|---|
| $Y_k$ | 1 | 1 | 0 | 0 |
| $\Delta\phi$ | $-3\pi/4$ | $3\pi/4$ | $\pi/4$ | $-\pi/4$ |

The quadrature signal $(I_k,Q_k)$ obtained in this way is passed through a lowpass filter to have a limited band and to be converted into I-phase and Q-phase components. A modulating circuit provides the inphase and quadrature-phase components for a wireless circuit.

FIG. 1 shows symbols $(X_k,Y_k)$ mapped on a two-dimensional I-Q coordinate. By focusing on the movement of a signal point represented by a quadrature signal $(I_k,Q_k)$, it is found that the signal point becomes any of signal points A–D and any of signal points E–H alternately. As is apparent from FIG. 1, signal points A–D are represented by a two-dimensional coordinate system represented by vector Iα on the I-axis and vector Qα on the Q-axis as the axes. Also, signal points E–H are represented by a two-dimensional coordinate system represented by vector Iβ and vector Qβ as the axes, which are respectively equivalent to vectors Iα and Qα rotated by π/4. For example, suppose a current baseband signal is a piece of information represented by symbol point F. Then, "0" is given as its Iα coordinate, "0" as its Qα coordinate, "−1" as its Iβ coordinate, and "+1" as its Qβ coordinate.

Suppose the coordinates of the k-th symbol using the above four vectors are respectively $I_\alpha$, Q, I, and $Q_k$. Then, the quadrature coordinates of k-th symbol, $I_k$ and $Q_k$, are represented by Formulae 2 and 3 respectively.

$$I_k = I_{\alpha k} + \frac{I_{\beta k}}{\sqrt{2}} - \frac{Q_{\beta k}}{C2} \quad \text{Formula 2}$$

$$Q_k = Q_{\alpha k} + \frac{I_{\beta k}}{\sqrt{2}} + \frac{Q_{\beta k}}{\sqrt{2}} \quad \text{Formula 3}$$

Accordingly, I-phase signal I(t) and Q-phase signal Q(t) output from the modulating circuit are represented by Formula 4 in which h(t) represents a rectangular waveform response function used in the lowpass filter.

$$I(t) = \sum_{k=-\infty}^{\infty} I_k h(t-kT) \quad \text{Formula 4}$$

$$= \sum_{k=-\infty}^{\infty} I_{\alpha k} h(t-kT) +$$

$$\frac{1}{\sqrt{2}} \sum_{k=-\infty}^{\infty} I_{\beta k} h(t-kT) -$$

$$\frac{1}{\sqrt{2}} \sum_{k=-\infty}^{\infty} Q_{\beta k} h(t-kT)$$

$$Q(t) = \sum_{k=-\infty}^{\infty} Q_k h(t-kT) \quad \text{Formula 5}$$

$$= \sum_{k=-\infty}^{\infty} Q_{\alpha k} h(t-kT) +$$

$$\frac{1}{\sqrt{2}} \sum_{k=-\infty}^{\infty} I_{\beta k} h(t-kT) +$$

$$\frac{1}{\sqrt{2}} \sum_{k=-\infty}^{\infty} Q_{\beta k} h(t-kT)$$

Formulae 4 and 5 indicate that limiting the bands of quadrature signals $I_k$ and $Q_k$ may be achieved by limiting bands of each term of Formulae 2 and 3.

Here, if it is supposed that in FIG. 1, symbol points A–D are odd and symbol points E–H are even in order, the following formulae are given.

$$I_{\alpha k}, Q_{\alpha k} = \begin{cases} \pm 1 & (k = 2N+1) \\ 0 & (k = 2N) \end{cases} \quad \text{Formula 6}$$

$$I_{\beta k}, Q_{\beta k} = \begin{cases} 0 & (k = 2N+1) \\ \pm 1 & (k = 2N) \end{cases} \quad \text{Formula 7}$$

Hence, I(t) and Q(t) are represented by the following formulae.

$$I(t) = \sum_{N=-\infty}^{\infty} I_{\alpha 2N+1} h\{t-(2N+1)T\} + \quad \text{Formula 8}$$

$$\frac{1}{\sqrt{2}} \sum_{N=-\infty}^{\infty} I_{\beta 2N} h(t-2NT) - \frac{1}{\sqrt{2}} \sum_{N=-\infty}^{\infty} Q_{\beta 2N} h(t-2NT)$$

$$Q(t) = \sum_{N=-\infty}^{\infty} Q_{\alpha 2N+1} h\{t-(2N+1)T\} + \quad \text{Formula 9}$$

$$\frac{1}{\sqrt{2}} \sum_{N=-\infty}^{\infty} I_{\beta 2N} h(t-2NT) + \frac{1}{\sqrt{2}} \sum_{N=-\infty}^{\infty} Q_{\beta 2N} h(t-2NT)$$

As apparent from the above formulae, of symbols $I_{\alpha k}$, $Q_\alpha$, I, and Q being four vectors of signals I(t) and Q(t), I and $Q_{\square k}$ may be represented by using only odd symbol signals, and $I_\beta$ and $Q_{\beta k}$ by using only even symbol signals.

FIG. 2 is a block diagram showing the construction of the conventional π/4-shift QPSK modulating apparatus 600.

π4-shift QPSK modulating apparatus 600 includes input terminal 601, symbol generating circuit 602, mapping circuit 603, timing generating circuit 605, coordinate accumulators 606, 607, 608, and 609, first storage unit 610, second storage unit 611, third storage unit 612, fourth storage unit 613, subtractor 614, adders 615, 616, and 617, D/A converters 618 and 619, and output terminals 620 and 621. Mapping circuit 603 includes differential encoding circuit 604.

The baseband signal that is to be modulated is serially input to symbol generating circuit 602 through input terminal 601.

Symbol generating circuit 602 is achieved by a π/4-shift register. Symbol generating circuit 602 receives a baseband signal with the timing of clock CL1 provided by timing generating circuit 605, and converts the received baseband signal through series-to-parallel conversion into a symbol $(X_k, Y)$, which is a two-bit parallel signal.

Mapping circuit 603 receives the symbol $(X_k, Y_k)$ generated by symbol generating circuit 602 with the timing of clock CL2 provided by timing generating circuit 605. Mapping circuit 603 performs, to generate a piece of two-bit address data, a certain mapping based on the received symbol $(X_k, Y_k)$ or a result of differential encoding. Mapping circuit 603 provides one bit of the piece of two-bit address data for each of coordinate accumulators 606 and 607 with odd symbol timing, and the other bit of the two-bit address data for each of coordinate accumulators 608 and 609 with even symbol timing.

Differential encoding circuit 604, if necessary, performs differential encoding using the received symbol $(X_k, Y_k)$ and the preceding symbol $(X_{k-1}, Y)$ with the timing of clock CL2 provided by timing generating circuit 605.

Timing generating circuit 605 generates timing signals for entire π/4-shift QPSK modulating apparatus 600 based on a clock signal having a higher frequency than that of the baseband signal. CL1 is a clock signal having the same frequency as that of the baseband signal. CL2 is a clock signal having the same frequency as that of symbol data. CL3 is a clock signal having the same frequency as that of symbol data and generates even and odd symbol timing. Timing generating circuit 605 generates elapsed-time information of even and odd symbol periods and provides the information as a lower address for first storage unit 610, second storage unit 611, third storage unit 612, and fourth storage unit 613.

Coordinate accumulators 606, 607, 608, and 609 are sift registers and converts in series and parallel each of the addresses provided by mapping circuit 603. Outputs from coordinate accumulators 606, 607, 608, and 609 are respectively provided for first storage unit 610, second storage unit 611, third storage unit 612, and fourth storage unit 613.

First storage unit 610 receives an output from coordinate accumulator 606 as a higher address and elapsed-time information from timing generating circuit 605 as a lower address. First storage unit 610 prestores waveform data corresponding to I-coordinates (I-components). The waveform data indicates response waveforms from the lowpass filter at the time when ±1 is input to the lowpass filter with odd symbol timing, and a response waveform from the lowpass filter when 0 is input with even symbol timing. Accordingly, first storage unit 610 prestores a digital value corresponding to "$\Sigma I_{\alpha 2N+1} h\{t-(2N+1)T\}$" in Formula 8.

Second storage unit 611 receives an output from coordinate accumulator 607 as a higher address and elapsed-time information from timing generating circuit 605 as a lower address. Second storage unit 611 prestores waveform data corresponding to Q-coordinates (Q-components). The waveform data indicates response waveforms from the lowpass filter at the time when ±1 is input to the lowpass filter with odd symbol timing, and a response waveform when 0 is input with even symbol timing. Accordingly, second storage unit 611 stores a digital value corresponding to "$\Sigma Q_{\alpha 2N+1} h\{t-(2N+1)T\}$" in Formula 9.

Third storage unit 612 receives an output from coordinate accumulator 608 as a higher address and elapsed-time information from timing generating circuit 605 as a lower address. Third storage unit 612 prestores waveform data corresponding to I-coordinates (I-components). The waveform data indicates $1/\sqrt{2}$ response waveforms from the lowpass filter (in the present specification, square root of 2 is represented by $\sqrt{2}$) at the time when ±1 is input to the lowpass filter with even symbol timing, and a $1/\sqrt{2}$ response waveform when 0 is input with odd symbol timing. Accordingly, third storage unit 612 stores a digital value corresponding to "$\Sigma(1/\sqrt{2})I_{\beta 2N} h(t-2NT)$" in Formulae 8 and 9.

Fourth storage unit 613 stores an output from coordinate accumulator 609 as a higher address and elapsed-time information from timing generating circuit 605 as a lower address and stores waveform data corresponding to Q-coordinates (Q-components). The waveform data indicates $1/\sqrt{2}$ response waveforms from the lowpass filter at the time when ±1 is input to the lowpass filter with even symbol timing, and a $1/\sqrt{2}$ response waveform when 0 is input with odd symbol timing. Accordingly, fourth storage unit 613 stores a digital value corresponding to "$\Sigma(1/\sqrt{2})Q_\beta h(t-2NT)$" in Formulae 8 and 9.

Subtractor 614 subtracts the output of fourth storage unit 613 from the output of third storage unit 612 to execute a subtraction of the third term from the second term in Formula 8.

Adder 615 adds the outputs of third and fourth storage units 613 and 614 to execute an addition of the second and third terms in Formula 9.

Adder 616 adds the output of subtracter 614 and the output of first storage unit 610, namely, the first term of Formula 8, and outputs instantaneous value I(t) of I-phase signal in Formula 8.

Adder 617 adds the output of adder 615 and the output of second storage unit 611, namely, the first term of Formula 9, and outputs instantaneous value Q(t) of Q-phase signal in Formula 9.

D/A converter 618 converts the output of adder 616 into the analog signal and outputs the analog signal via output terminal 620 to a mixer that is not shown in the drawing. The mixer multiplies the output of D/A converter 618 by the carrier wave.

D/A converter 619 converts the output of adder 617 into the analog signal and outputs the analog signal via output terminal 621 to another mixer that is not shown in the drawing. This mixer multiplies the output of D/A converter 619 by the carrier wave which is input via a phase shifter. These two quadrature components of the carrier wave generated in this way are added and output to a transmitting circuit not shown in the drawing.

As is apparent from the above description, a response waveform corresponding to "$\Sigma I_\alpha h\{t-(2N+1)T\}$," namely, the first term in Formula 8, and a response waveform corresponding to "$\Sigma Q_{\alpha 2N+1} h\{t-(2N+1)T\}$," namely, the first term in Formula 9, may be generated from the same waveform data. Also, a response waveform corresponding to "$\Sigma(1/\sqrt{2})I_\beta h(t-2NT)$," namely, the second term in Formulae 8 and 9, and a response waveform corresponding to "Σ(1/√2)Q_β h(t−2NT)," namely, the third term in Formula 8 and 9, may be generated from the same waveform data. That means first storage unit 610 and second storage unit 611 of the conventional π/4-shift QPSK modulating apparatus 600 store the same filter data. It is the same with third storage unit 612 and fourth storage unit 613. Generally, such storage units are achieved by ROMs. However, increases in the number and the capacity of ROMs lead to an increase in the circuit scale, which generates a problem in cost and a disadvantage in achieving the circuits in LSI.

Furthermore, transmitting the signal modulated with the above construction with burst transmission causes another problem in that the frequency band of the transmission signal expands due to an enormous spurious emission generated by a steep rise of the transmission signal.

A method for preventing the problem is known in which a certain ramp period is set before and after the transmission of the modulated signal so that the transmission signal rises and falls smoothly according to the envelopes in the ramp periods. This processing is known as ramp processing. In the conventional ramp processing, the amplification factor of the transmission amplifier is smoothly increased or reduced so that the level of the transmission signal smoothly rises and falls. However, it is difficult to change the amplification factor of the transmission amplifier, that is, to correctly change the level of the transmission signal according to the function selected as an optimal ramp waveform. Therefore, it has been difficult to perform the ramp processing accurately.

SUMMARY OF THE INVENTION

It is therefore an object of the present invention to provide a phase modulating apparatus which has a simple circuit construction by effectively using waveform storage units and which generates a modulated signal with which an accurate burst transmission is possible.

The above object is achieved by a phase modulating apparatus including: storage means for storing waveform data including a plurality of waveforms used for rise ramp processing, a plurality of phase waveforms used for both I-component and Q-component of a plurality of transmission symbols, and a plurality of waveforms used for fall ramp processing; converting means for converting each of a dummy symbol for the rise ramp processing, the plurality of transmission symbols, and a dummy symbol for the fall ramp processing into the I-component and the Q-component, wherein the dummy symbol for the rise ramp processing, the plurality of transmission symbols, and the dummy symbol for the fall ramp processing are provided in time series; address providing means for outputting alternately during one symbol period the I-component and the Q-component converted by the converting means as addresses of the storage means; separating means for fetching an I-component waveform and a Q-component waveform which are read alternately from the storage means and outputting simultaneously the I-component waveform and the Q-component waveform; and combining means for combining the I-component waveform and the Q-component waveform output from the separating means into a symbol waveform.

With such a construction, the storage means may be used effectively as shown below. The ramp processing may be performed very easily since circuits for controlling the gain of a transmission amplifier are not required since ramp rise waveforms and ramp fall waveforms are read from the storage means respectively before and after the transmission data transmission section and the read waveforms are combined into symbol waveforms via the separating means and the combining means. Furthermore, this construction has succeeded in reducing the storage capacity since the same waveforms are used in the transmission section for both I-component and Q-component by setting the address providing means and the separating means respectively before and after the storage means.

The address providing means of the above phase modulating apparatus may include: timing generating means for generating first timing information which indicates any of a rise ramp processing section, a transmission section, and a fall ramp processing section and second timing information which indicates the symbol period used in each of the rise ramp processing section, the transmission section, and the fall ramp processing section; selecting means for selecting alternately during one symbol period the I-component and the Q-component converted by the converting means according to the second timing information; and inputting means for inputting an address into the storage means, wherein the address includes a first partial address, which is the first timing information, and second partial address, which is an output from the selecting means.

The address providing means of the above phase modulating apparatus may include: I-shift register for accumulating I-components of a certain number of symbols converted by the converting means and outputting the I-components in parallel; and Q-shift register for accumulating Q-components of the certain number of symbols converted by the converting means and outputting the Q-components in parallel, wherein the selecting means selects alternately an output from the I-shift register and an output from the Q-shift register.

The separating means of the above phase modulating apparatus may include: first delay means for delaying the I-component waveform output from the storage means; and second delay means for delaying the Q-component waveform output from the storage means so that the second delay means is synchronized with the first delay means in outputting.

Furthermore, in a π/4-shift QPSK modulating apparatus achieving the above object, the switching means selects alternately an output from the I-coordinate accumulating means and an output from the Q-coordinate accumulating means according to a switch signal, which is faster than the time information, and outputs a selected output. Also, a response waveform from a digital filter to an I-coordinate input (or a corresponding ramp waveform) and a response waveform from a digital filter to an Q-coordinate input (or a corresponding ramp waveform) may be generated in a similar process based on the same response waveform from the digital filter. Accordingly, the rise ramp means, the filter means, and the fall ramp means may be used for both I-coordinate and Q-coordinate. That means, the response waveforms from a digital filter to an I-coordinate input and Q-coordinate (or corresponding ramp waveforms) may be alternately output with the frequency of the switching signal. The separating means separates the response waveforms from a digital filter to an I-coordinate input and Q-coordinate (or corresponding ramp waveforms) into two streams which respectively correspond to the I-coordinate and the Q-coordinate. Therefore, the π/4-shift QPSK modulating apparatus of the present invention has succeeded in reducing the number of storage units half that of the conventional π/4-shift QPSK modulating apparatus, which includes the filter means for each of the I-coordinate and Q-coordinate input to filters. This indicates that the π/4-shift QPSK modulating apparatus of the present invention has such a construction as reduces the number of circuits as a whole and makes it easier to achieve the whole apparatus in an LSI chip.

Furthermore, it is possible to perform the ramp processing between the burst rise section and the burst fall section since the reduction in the construction of the filter means enables including of the ramp period notifying means, the rise ramp means, and fall ramp means. This enables the present apparatus to perform accurate burst transmissions by having an embedded circuit for the ramp processing, while the conventional π/4-shift QPSK modulating apparatus has this circuit externally.

Each of the rise ramp means, the filter means, and the fall ramp means of the present π/4-shift QPSK modulating apparatus may include an odd storage unit and an even storage unit, wherein the odd storage unit stores response waveform data of a digital filter and also stores burst rise ramp waveform data and burst fall ramp waveform data which each correspond to the response waveform data of a digital filter, wherein the response waveform data of a digital filter is generated at a time when an I-coordinate and a Q-coordinate of an odd signal point are input to the digital filter by recognizing the ramp period notification signal, an output from the switching means, and the time information as an address, wherein the even storage unit stores response waveform data of a digital filter and also stores burst rise ramp waveform data and burst fall ramp waveform data which each correspond to the response waveform data of a digital filter, wherein the response waveform data of a digital filter is generated at a time when an I-coordinate and a Q-coordinate of an even signal point are input to the digital filter by recognizing the ramp period notification signal, an output from the switching means, and the time information as an address. Compared to a case where a filter means of the conventional π/4-shift QPSK modulating apparatus is achieved by a storage unit storing filter response waveforms for I-coordinate inputs, each storage unit of the present apparatus requires a larger storage capacity than the conventional filter means since each storage unit stores ramp waveform data. However, the present apparatus performs accurate burst transmissions by having an embedded circuit for the ramp processing, while the conventional π/4-shift QPSK modulating apparatus has this circuit externally.

BRIEF DESCRIPTION OF THE DRAWINGS

In the drawings:

FIGS. 7A and 7B show the relation between data stored in storage units and waveform data which is read from the storage units according to the two-MSB addresses given as address signal Tc;

DESCRIPTION OF THE PREFERRED EMBODIMENT

Figure 3:
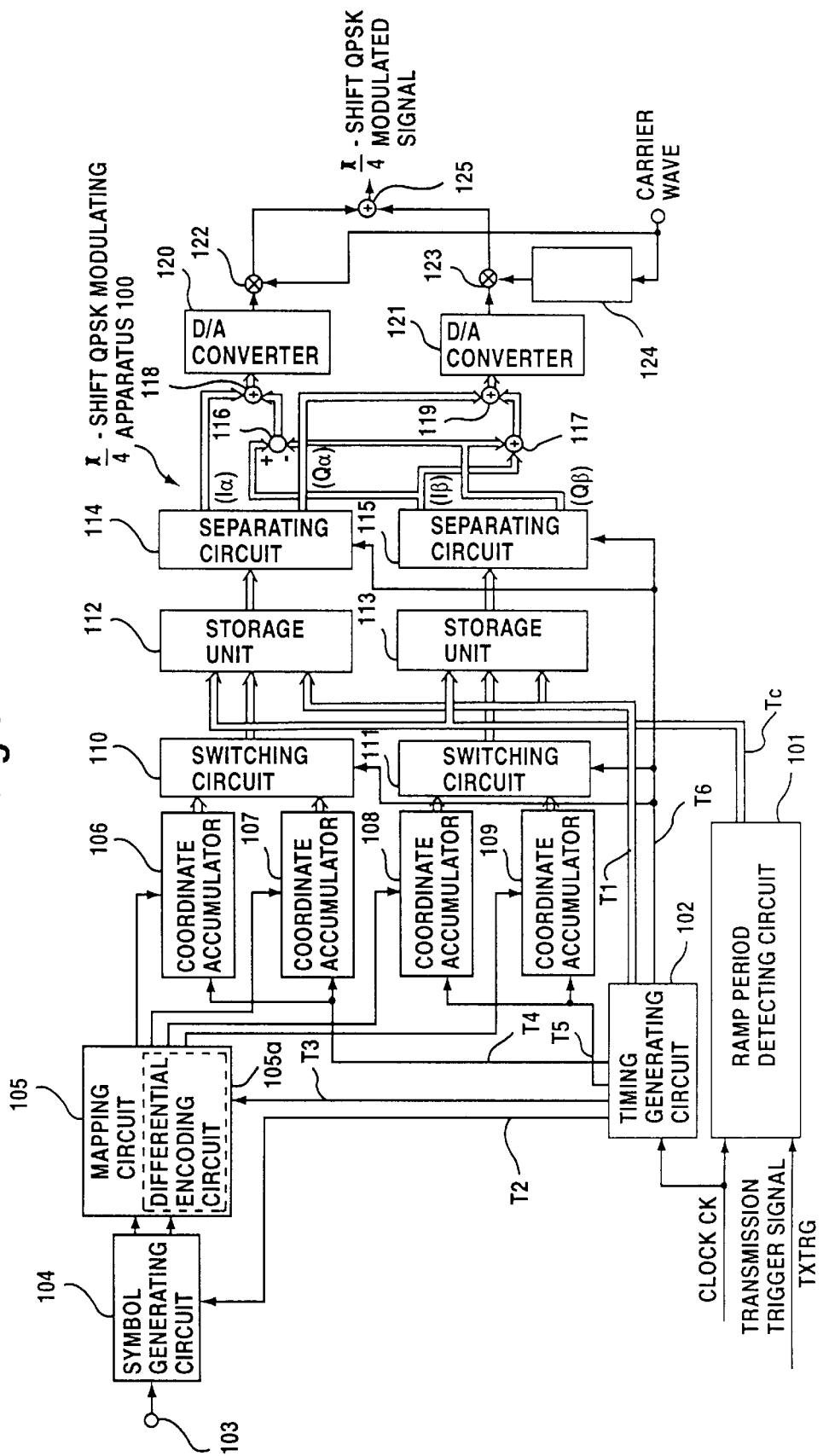
FIG. 3 is a block diagram showing a partial construction of the π/4-shift QPSK modulating apparatus of the present embodiment.

FIG. 3 is a block diagram showing the construction of π/4-shift QPSK modulating apparatus 100 of the present embodiment.

π/4-shift QPSK modulating apparatus 100, which is achieved in an LSI chip, includes ramp period detecting circuit 101 timing generating circuit 102 input terminal 103, symbol generating circuit 104, mapping circuit 105, coordinate accumulators 106, 107, 108, and 109, switching circuits 110 and 111, storage units 112 and 113, separating circuits 114 and 115, subtractor 116, adders 117, 118, and 119, and D/A converters 120 and 121. Mapping circuit 105 includes differential encoding circuit 105a. Mixers 122 and 123, phase shifter 124, and adder 125 are external circuits connected to π/4-shift QPSK modulating apparatus 100.

Figure 4:
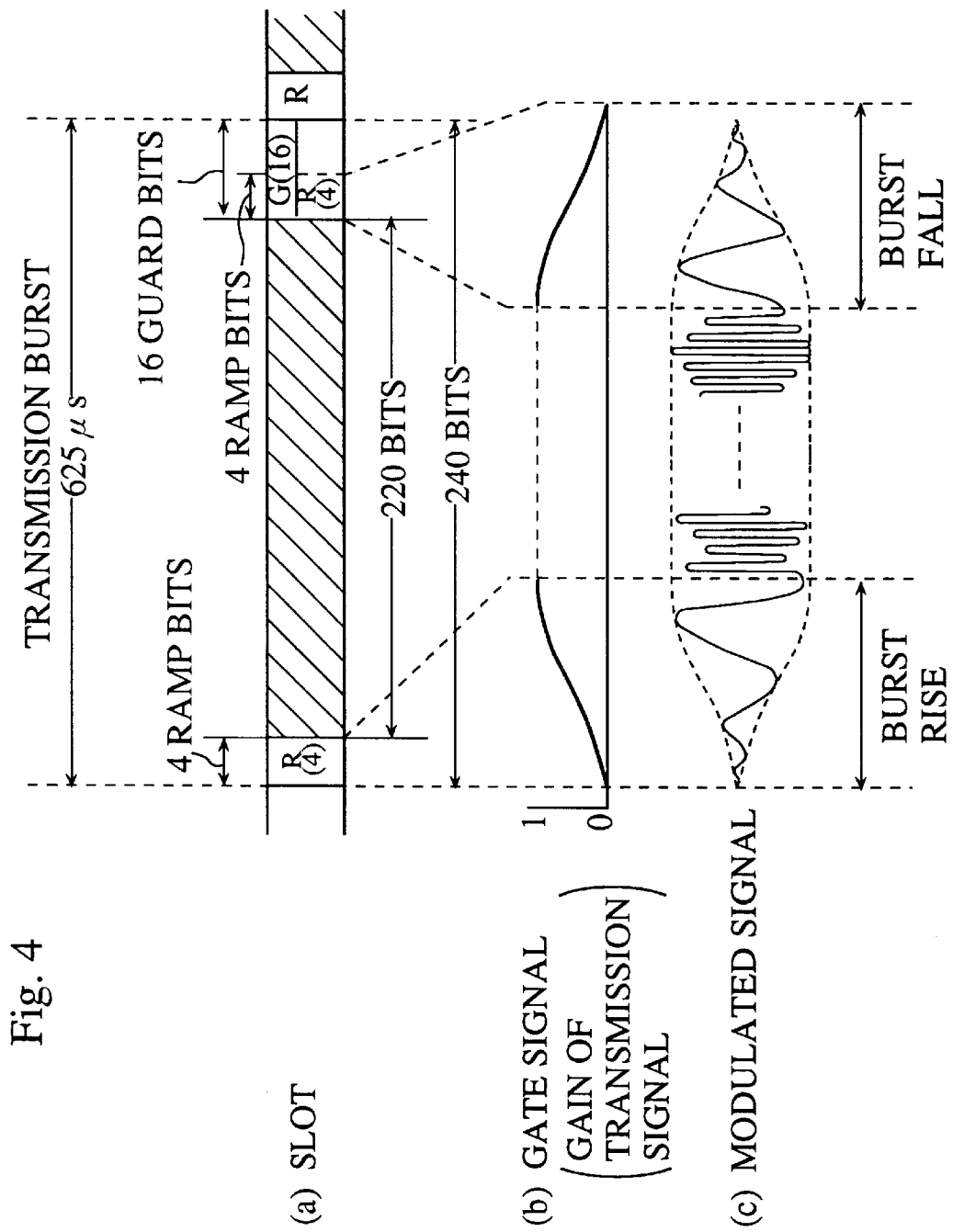
FIG. 4 shows the ramp period in a slot of a Time Division Multiple Access/Time Division Duplex (TDMA/TDD) frame and shows a ramp waveform generated.

FIG. 4 shows the ramp period in a slot of a Time Division Multiple Access/Time Division Duplex (TDMA/TDD) frame and shows a ramp waveform generated.

As has been described earlier, in the burst transmission of a modulated signal, the frequency band of the transmission signal expands due to an enormous spurious emission generated by a steep rise of the transmission signal. Therefore, for a communication system that performs burst transmissions with a digital modulation method such as π/4-shift QPSK, generally a certain ramp period is set for each of the burst rise and burst fall so that the ramp processing on the transmission signal is performed in the ramp periods.

For example, as shown in (a) SLOT of FIG. 4, each slot of TDMA/TDD frames for PHS (Personal Handyphone System) is assigned 625 μsec in which 240 bits of data may be transmitted with 384 KB/sec of physical transmission rate. The first four bits of each slot are used as ramp bits for the burst rise, and the last 16 bits as guard bits. The guard bits form a non-transmission section that is set to prevent the transmission data from being affected by spurious emissions or noises by other electric waves. It is determined that the receiver should not regard the ramp bits and guards bits as substantial data. Also, the first four bits of the guard bits are used as ramp bits for the burst fall. The baseband signal is not input to the last 12 bits of the guard bits. Therefore, on ending the ramp processing of the ramp bits for the burst fall, π/4-shift QPSK modulating apparatus 100 ends the modulating process.

The four bits in each of the burst rise and fall are input via input terminal 103 as a baseband signal representing dummy data. The ramp waveform as shown in (c) MODULATION SIGNAL of FIG. 4 is output based on the baseband signal. The ramp waveform rises and falls according to a smooth envelope. This ramp waveform is obtained by multiplying a gate signal as shown in (b) GATE SIGNAL of FIG. 4 by a modulated signal combined according to the baseband signal.

The baseband signal having substantial data is input during the 220-bit section (hereinafter referred to as "general transmission") sandwiched by the ramp bits.

Ramp period detecting circuit 101 receives clock CK being the same clock signal as that provided for timing generating circuit 102 and receives transmission trigger signal TXTRG, which indicates the transmission start of the modulated signal, from an external element such as a TDMA circuit.

Ramp period detecting circuit 101 starts counting clock CK when transmission trigger signal TXTRG becomes active. This allows a baseband signal representing substantial data to be input via input terminal 103 to π/4-shift QPSK modulating apparatus 100, allowing 100 to start processing.

Ramp period detecting circuit 101 recognizes the start of rise ramp processing when the count value of clock CK becomes equal to the delay of the start of modulation processing from an input, namely, to the response delay of digital filter for an input, after transmission trigger signal TXTRG becomes active.

Ramp period detecting circuit 101 outputs "01" as address signal Tc to storage units 112 and 113 while continuing to count clock CK. Address signal Tc being composed of two bits is used as two MSBs (Most Significant Bits) in the addresses of storage units 112 and 113. The storage areas in storage units 112 and 113 indicated by the two-MSB address "01" store ramp waveform data for rise ramp processing corresponding to the two-dimensional coordinate data used in the rise ramp processing.

Ramp period detecting circuit 101 recognizes the end of rise ramp processing when the count value of clock CK becomes equal to the time period between the time when transmission trigger signal TXTRG becomes active and the time when rise ramp processing ends. At the same time, a baseband signal being substantial data is input via input terminal 103 to π/4-shift QPSK modulating apparatus 100. Ramp period detecting circuit 101 outputs "00" as address signal Tc to storage units 112 and 113 while continuing to count clock CK. The storage areas in storage units 112 and 113 indicated by two-MSB address "00" store response waveform data from a lowpass filter such as a route Nyquist filter to an input of two-dimensional coordinate data which is obtained from a general-transmission baseband signal.

Also, ramp period detecting circuit 101 recognizes the start of fall ramp processing when the count value of clock CK becomes equal to the time period between the time when transmission trigger signal TXTRG becomes active and the time when fall ramp processing starts. A baseband signal being certain dummy data is input via input terminal 103 to π/4-shift QPSK modulating apparatus 100. Ramp period detecting circuit 101 outputs "10" as address signal Tc to storage units 112 and 113 while continuing to count clock CK. The storage areas in storage units 112 and 113 indicated by two-MSB address "10" store fall ramp waveform data corresponding to the two-dimensional coordinate data for the fall ramp processing.

Ramp period detecting circuit 101 recognizes the end of fall ramp processing when the count value of clock CK becomes equal to the time period between the time when transmission trigger signal TXTRG becomes active and the time when fall ramp processing ends. This allows π/4-shift QPSK modulating apparatus 100 to end the modulating process.

Figure 5:
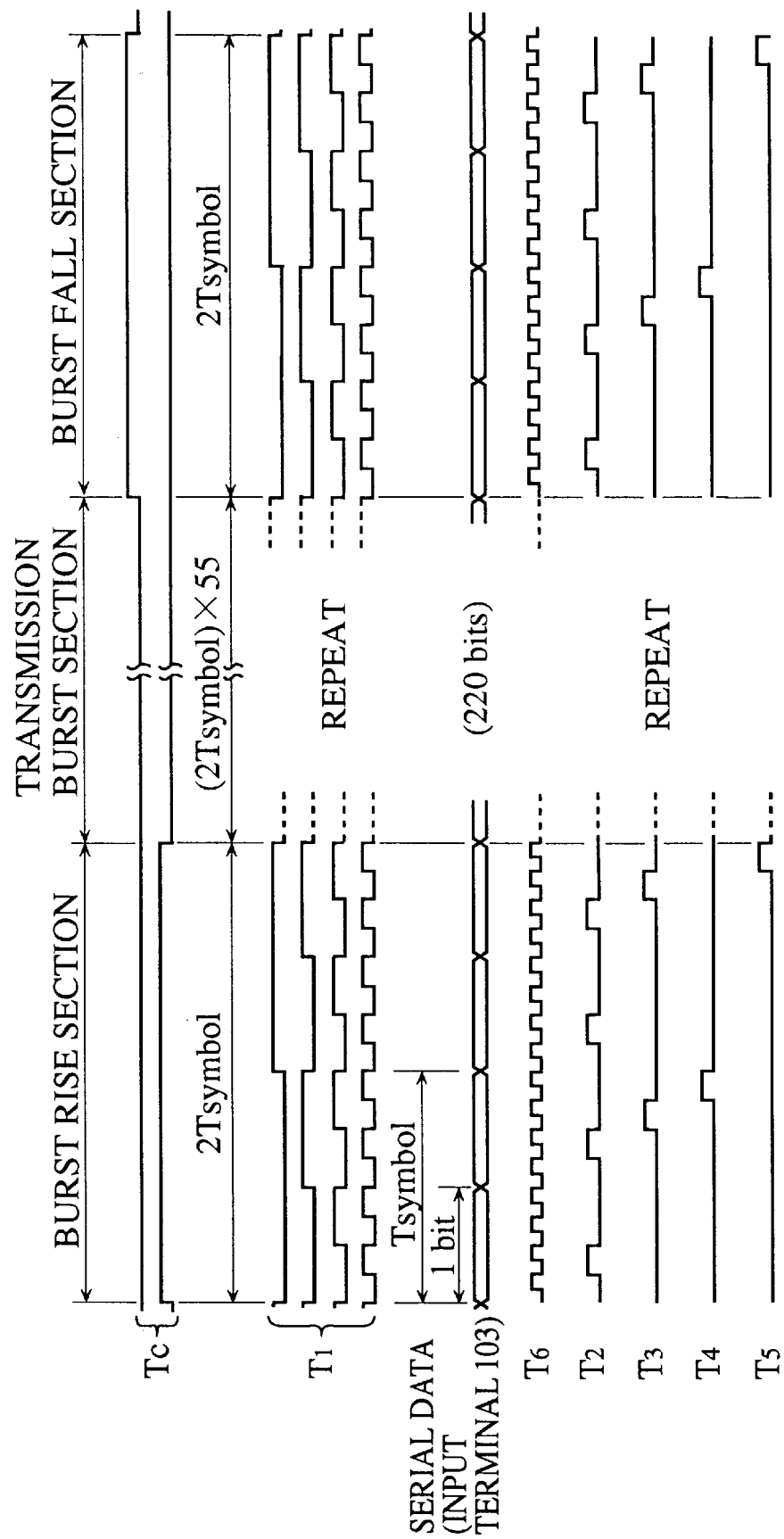
FIG. 5 is a time chart showing the timing signals generated by a timing generating circuit.

Timing generating circuit 102 generates clocks T1–T6 as shown in FIG. 5 based on clock CK which is provided from an external element and is a clock signal having a frequency higher than the bit rate of the input baseband signal. Clock T1 (four bits in FIG. 5) represents a count value of clock signal CK between an odd symbol timing opportunity and immediately before the next odd symbol timing opportunity and is provided for storage units 112 and 113. That is, clock T1 is elapsed time information indicating a time elapsed during two odd/even symbol periods. Clock T2 is a clock signal having the same frequency as that of the input baseband signal. Clock T3 is a clock signal having the same frequency as that of one symbol. Clock T4 is a clock signal having the same frequency as that of two symbols. Clock T5 is a clock signal having a reversed phase of clock T4. Clock T6 is a switch signal having a switching speed twice the count of clock T1 that is elapsed time information.

Input terminal 103 is used to input a baseband signal, namely serial data as a signal to be modulated, to π/4-shift QPSK modulating apparatus 100.

Symbol generating circuit 104 is achieved by a shift register. Symbol generating circuit 104 receives a baseband signal with the timing of clock T1 provided by timing generating circuit 102, and converts the received baseband signal in series and parallel to generate symbol $(X_k,Y)$, which is composed of successive two bits in the baseband signal.

Mapping circuit 105 receives the symbol data generated by symbol generating circuit 104 with the timing of clock T3 having the same frequency as that of symbol data, the clock T3 being provided by timing generating circuit 102. Mapping circuit 105 performs a certain mapping based on the received symbol data or an encoding result of differential encoding circuit 105a to generate a piece of two-bit two-dimensional coordinate data representing an address.

Now, an example of two-dimensional coordinate data output from mapping circuit 105 is described with reference to FIG. 1.

As previously mentioned, a signal point represented by a quadrature signal $(I_k,Q_k)$ becomes any of signal points A–D and any of signal points E–H alternately. Also, the coordinates of points A–D are respectively represented as A(1,1), B(-1,1), C(-1,-1), and D(1,-1) on a two-dimensional coordinate represented by vector Iα and vector Qα as the axes. Also, the coordinates of points E–H are respectively represented as E(1,1), F(-1,1), G(-1,-1), and H(1,-1) on a two-dimensional coordinate represented by vector Iβ and vector Qβ as the axes.

Here, suppose a baseband signal "1, 0, 1, 1, 0, 0, 0, 1, . . ." is input to input terminal 103. Then, symbol generating circuit 104 generates a sequence of two-bit symbols (X1, Y1)=(1,0), (X2,Y2)=(1,1), (X3,Y3)=(0,0), (X4,Y4)=(0,1) . . . in sequence.

Figure 1:
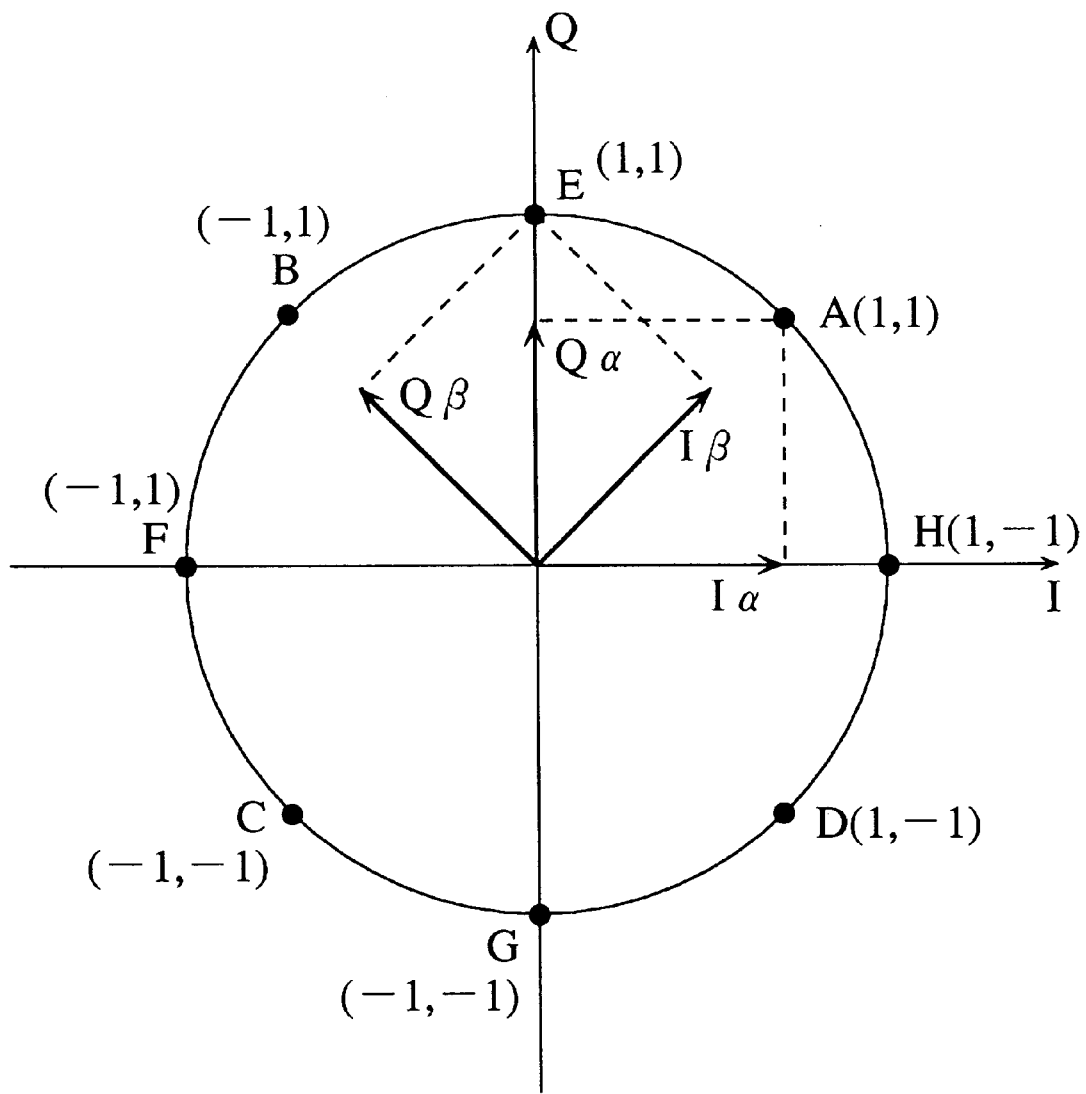
FIG. 1 shows symbols $(X_k, Y_k)$ mapped on a two-dimensional I-Q coordinate.
Figure 2:
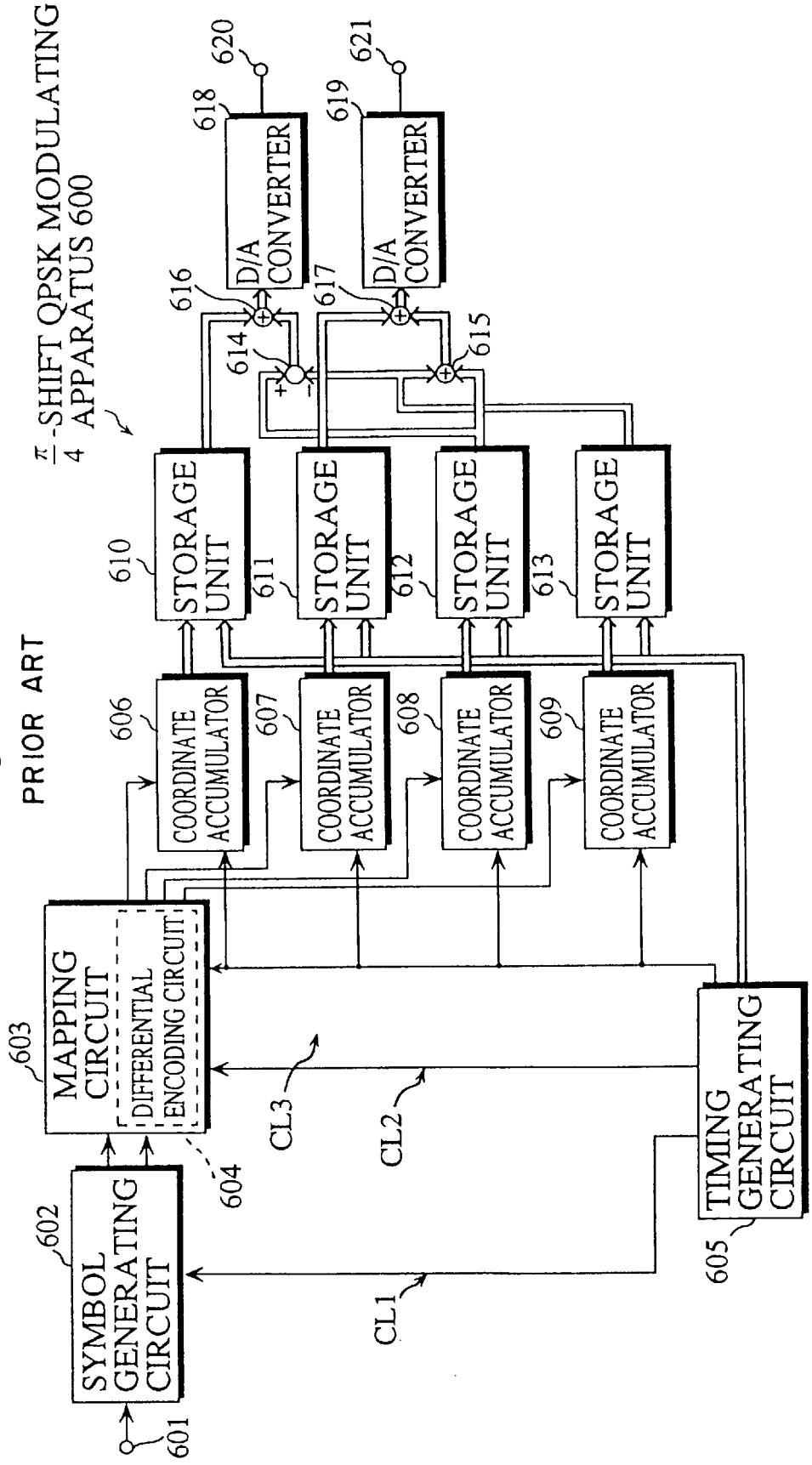
FIG. 2 is a block diagram showing the construction of a conventional π/4-shift QPSK modulating apparatus.

Mapping circuit 105 obtains the coordinates of the signal points indicated by the symbols by using signal point H shown in FIG. 1 as a standard point. For example, it is found from Table 1 that the odd symbol (X1,Y1) indicates signal point D having phase difference -π/4 between itself and point H. The signal point D is represented as D(1,-1) on a two-dimensional coordinate represented by vector Iα and vector Qα as the axes. Note that "-1" is represented as "0" since "-1" cannot be represented by one bit. Mapping circuit 105 outputs two-dimensional coordinates D(1,0) as the mapping result for symbol (X1,Y1). The first bit "1" of the two-dimensional coordinates D(1,0) is output to coordinate accumulator 106, and the second bit "0" to coordinate accumulator 107.

Similarly, the next even symbol (X2,Y2) indicates signal point F having phase difference -3 π/4 between itself and point D. The coordinate values of signal point F are represented as F(-1,1) on a two-dimensional coordinate represented by vectors Iβ and Qβ as the axes. Mapping circuit 105 outputs two-dimensional coordinates F(0,1) as the mapping result for symbol (X2,Y2). The first bit "0" of the two-dimensional coordinates F(0,1) is output to coordinate accumulator 108, and the second bit "1" to coordinate accumulator 109.

Similarly, the next odd symbol (X3,Y3) indicates signal point C having phase difference π/4 between itself and point F. Mapping circuit 105 outputs two-dimensional coordinates C(0,0). The first bit "0" is output to coordinate accumulator 106, and the second bit "0" to coordinate accumulator 107. The next even symbol (X4,Y4) indicates signal point H having phase difference 3 π/4 between itself and point C. Mapping circuit 105 outputs two-dimensional coordinates H(1,0). The first bit "1" is output to coordinate accumulator 108, and the second bit "0" to coordinate accumulator 109.

Differential encoding circuit 105*a* if necessary performs differential encoding on the symbol data received by mapping circuit 105. More specifically, differential encoding circuit 105*a* obtains the signal point of symbol $(X_k,Y_k)$ by storing in advance a conversion table corresponding to Table 1 and storing at least one signal point indicated by the preceding symbol $(X_{k-1},Y_{k-1})$.

Coordinate accumulator 106, achieved by a shift register, accumulates Iα-coordinates one bit by one bit for each odd symbol timing opportunity, and outputs a certain number of accumulated bits, for example, five bits of Iα-coordinates as five higher bits succeeding to the two MSBs in storage unit 112 to switching circuit 110. According to these five higher bits, filter response waveform (or ramp waveform) data corresponding to the Iα-coordinates input with odd symbol timing is read from storage unit 112.

Coordinate accumulator 107, achieved by a shift register, accumulates Qα-coordinates one bit by one bit for each odd symbol timing opportunity, and outputs a certain number of accumulated bits, for example, five bits of Qα-coordinates as five higher bits succeeding to the two MSBs in storage unit 112 to switching circuit 110. According to these five higher bits, filter response waveform (or ramp waveform) data corresponding to the Qα-coordinates input with odd symbol timing is read from storage unit 112.

Coordinate accumulator 108, achieved by a shift register, accumulates Iβ-coordinates one bit by one bit for each odd symbol timing opportunity, and outputs a certain number of accumulated bits, for example, five bits of Iβ-coordinates as five higher bits succeeding to the two MSBs in storage unit 113 to switching circuit 111. According to these five higher bits, 1/β filter response waveform (or ramp waveform) data corresponding to the Iβ-coordinates input with odd symbol timing is read from storage unit 113.

Coordinate accumulator 109, achieved by a shift register, accumulates Qβ-coordinates one bit by one bit for each odd symbol timing opportunity, and outputs a certain number of accumulated bits, for example, five bits of Qβ-coordinates as five higher bits succeeding to the two MSBs in storage unit 113 to switching circuit 111. According to these five higher bits, 1/β filter response waveform (or ramp waveform) data corresponding to the Qβ-coordinates input with odd symbol timing is read from storage unit 113.

Figure 6:
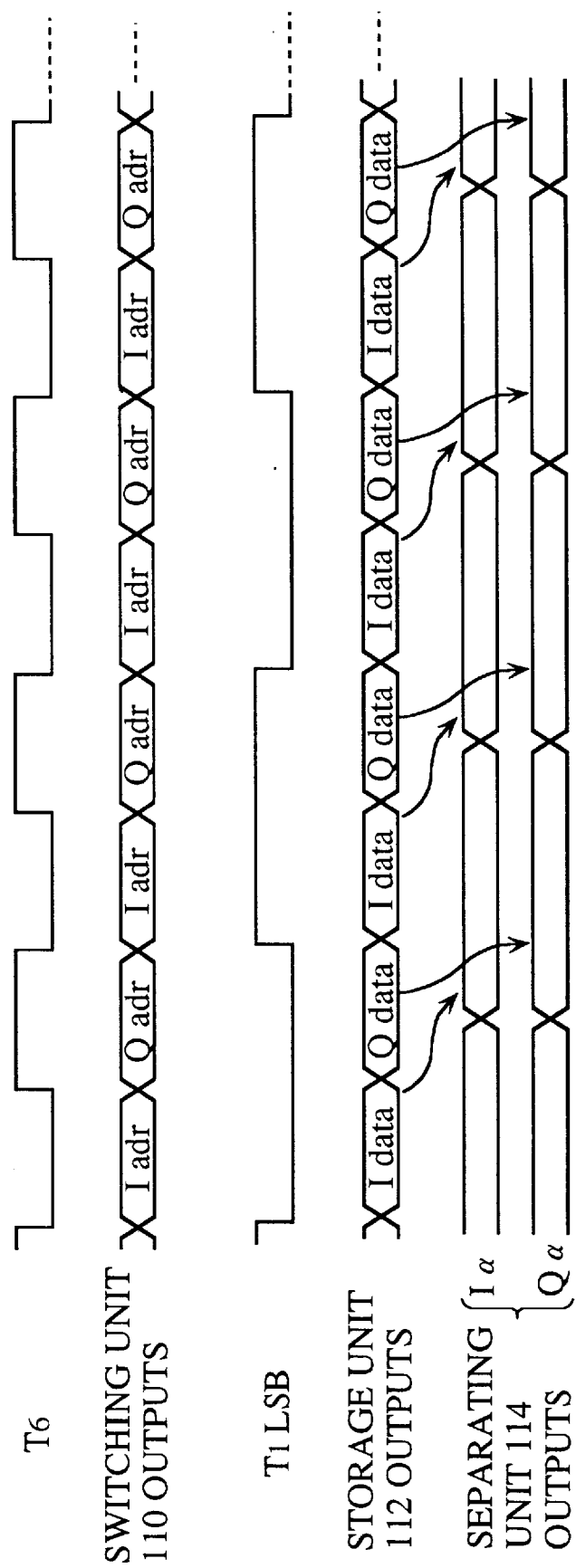
FIG. 6 is a time chart showing the operation timing of a switching circuit and separating circuit.

Switching circuit 110 is achieved by a selector and the like. Switching circuit 110 outputs addresses input from coordinate accumulators 106 and 107 alternately to storage unit 112 with the timing of clock T6 before a current piece of elapsed time information is switched to another one with the timing of clock T1. FIG. 6 shows the output from switching circuit 110 and clock T6 at the output.

Switching circuit 111 is, as switching circuit 110 is, achieved by a selector and the like. Switching circuit 111 outputs addresses input from coordinate accumulators 108 and 109 alternately to storage unit 113 with the timing of clock T6 before a current piece of elapsed time information is switched to another one with the timing of clock T1.

Storage unit 112 stores address signal Tc sent from ramp period detecting circuit 101 as a two-MSB address, stores the outputs of coordinate accumulators 106 and 107 as addresses of bits succeeding to the two MSBs, and stores clock T1, namely, elapsed time information sent from timing generating circuit 102 as bits succeeding to all these bits.

FIGS. 7A and 7B show the relation between data stored in storage units 112 and 113 and waveform data which is read from storage units 112 and 113 according to the two-MSB addresses given as address signal Tc.

In a storage area indicated by two-MSB address "00" in storage unit 112, waveform data of general transmission corresponding to Iα- and Qα-coordinates is stored. The waveform data of general transmission is data showing the level (instantaneous value) of the response waveform from the lowpass filter such as route Nyquist filter which is given for an Iα-/Qα-coordinate input. Storage unit 112 stores waveform data corresponding to odd symbol timing, that is, response waveform data from a filter to input +1 which are the Iα- and Qα-coordinates of odd symbol timing. Also, storage unit 112 stores waveform data corresponding to even symbol timing, that is, response waveform data from the lowpass filter to input 0 which is the Iα- and Qα-coordinates of even symbol timing.

In a storage area indicated by two-MSB address "01" in storage unit 112, waveform data at burst rise is stored.

Note that each piece of the ramp waveform data stored in storage units 112 and 113 is gained by multiplying a window function representing (b) GATE SIGNAL shown in FIG. 4 by a filter response waveform corresponding to each of Iα-, Qα-, Iβ-, and Qβ-coordinates. That is, if it is supposed that g(t) represents the window function, and I(t)g(t) and Q(t)g(t) respectively instantaneous values of I-phase and Q-phase of the ramp waveform, then the following Formulae are given.

$$I(t)g(t) = \sum_{N=-\infty}^{\infty} I_{\alpha 2N+1} h\{t-(2N+1)T\}g\{t-(2N+1)T\} + \qquad \text{Formula 10}$$
$$\frac{1}{\sqrt{2}} \sum_{N=-\infty}^{\infty} I_{\beta 2N} h(t-2NT)g(t-2NT) -$$
$$\frac{1}{\sqrt{2}} \sum_{N=-\infty}^{\infty} Q_{\beta 2N} h(t-2NT)g(t-2NT)$$

$$Q(t)g(t) = \sum_{N=-\infty}^{\infty} Q_{\alpha 2N+1} h\{t-(2N+1)T\}g\{t-(2N+1)T\} + \qquad \text{Formula 11}$$
$$\frac{1}{\sqrt{2}} \sum_{N=-\infty}^{\infty} I_{\beta 2N} h(t-2NT)g(t-2NT) +$$
$$\frac{1}{\sqrt{2}} \sum_{N=-\infty}^{\infty} Q_{\beta 2N} h(t-2NT)g(t-2NT)$$

The ramp waveform in MODULATED SIGNAL (c) of FIG. 4 is obtained by combining (adding) the inphase component in the carrier wave modulated by amplifying I(t)g(t) of Formula 10 and the quadrature-phase component in the carrier wave modulated by amplifying Q(t)g(t) of Formula 11.

Accordingly, the storage area in storage unit 112 indicated by two-MSB address "01" stores the ramp waveform data for rise ramp processing corresponding to two-dimensional coordinates (Iα,Qα), that is, the ramp waveform data for rise ramp processing corresponding to the first term of Formulae (10) and (11). For the burst rise, Iα- and Qα-coordinates can only be "+1" or "−1" with odd symbol timing, and "0" with even symbol timing. This is the same as for general transmission.

Also, the storage area in storage unit 112 indicated by two-MSB address "10" stores the ramp waveform data for fall ramp processing corresponding to two-dimensional coordinates (Iα,Qα), that is, the ramp waveform data for fall ramp processing corresponding to the first term of Formulae (10) and (11). For the fall ramp processing, Iβ-and Qβ-coordinates can only be "0" with odd symbol timing, and "+1" or "−1" with even symbol timing. This is the same as for general transmission.

In a general transmission, two-MSB address "00" given as address signal Tc and the succeeding higher bits from coordinate accumulators 106 and 107 divided in time division with the timing of clock T6 are input to storage unit 112. The higher bits from coordinate accumulators 106 and 107 are updated with each odd symbol timing opportunity. In parallel with these pieces of data, a lower address as clock T1 of elapsed time information is input to storage unit 112. Clock T1 represents a count value of clock signal CK between an odd symbol timing opportunity and immediately before the next odd symbol timing opportunity.

Coordinate accumulator 106 outputs Iα-coordinates accumulated with odd symbol timing to storage unit 112 as, for example, five higher bits succeeding to the two MSBs. The LSB of the five higher bits is the Iα-coordinate of the current odd symbol timing opportunity and the other four bits are Iα-coordinates of the previous odd timing opportunities, with "−1" represented by "0." According to these five higher bits, the filter response waveform data corresponding to the current elapsed time information for the Iα-coordinate of the current odd symbol timing opportunity is read from storage unit 112, for example, with the odd timing of clock T6.

Coordinate accumulator 107 outputs Qα-coordinates accumulated with odd symbol timing to storage unit 112 as, for example, five higher bits succeeding to the two MSBs. Of the five higher bits, the LSB is the Qα-coordinate of the current odd symbol timing opportunity and the other four bits are Qα-coordinates of the previous odd timing opportunities, with "−1" represented by "0." According to these five higher bits, the filter response waveform data corresponding to the current elapsed time information for the Qα-coordinate of the current odd symbol timing opportunity is read from storage unit 112, for example, with the even timing of clock T6.

No address is input to storage unit 112 from coordinate accumulators 106 and 107 with even symbol timing. However, clock T1 of elapsed time information indicates even symbol timing. As has been described earlier, both Iα- and Qα-coordinates are "0" with even symbol timing. Therefore, two kinds of the filter response waveform data at each elapsed time with input "0" are read alternately in time division from storage unit 112 every time the Lower address exceeds a certain value.

The only difference between the rise ramp processing and the general transmission is that the two-MSB address "0" given by address signal Tc is input to storage unit 112. The rise ramp processing is performed the same as the general transmission in terms of the rest of the processing, that is, addresses of higher bits succeeding to the two MSBs are input from coordinate accumulators 106 and 107 to storage unit 112, and, in parallel, clock T1 as a lower address.

Coordinate accumulator 106 outputs Iα-coordinates accumulated with odd symbol timing to storage unit 112 as, for example, five higher bits succeeding to the two MSBs. According to these five higher bits, the ramp waveform data at the burst rise corresponding to the current elapsed time information for the Iα-coordinate of the current odd symbol timing opportunity is read from storage unit 112, for example, with the odd timing of clock T6.

Coordinate accumulator 107 outputs Qα-coordinates accumulated with odd symbol timing to storage unit 112 as, for example, five higher bits succeeding to the two MSBs. According to these five higher bits, the ramp waveform data at the burst rise corresponding to the current elapsed time information for the Qα-coordinate of the current odd symbol timing opportunity is read from storage unit 112, for example, with the even timing of clock T6.

Both Iα- and Qα-coordinates are "0" with even symbol timing. Therefore, two kinds of the ramp waveform data at the burst rise at each elapsed time with input "0" are read alternately in time division from storage unit 112 every time the Lower address exceeds a certain value.

The only difference between the fall ramp processing and the general transmission is that two-MSB address "10" given by address signal Tc is input to storage unit 112.

With odd symbol timing, as the higher addresses, which are input from coordinate accumulators 106 and 107 alternately in time division with the timing of clock T6, and a lower address given as clock T1 of elapsed time information are input to storage unit 112, two pieces of the ramp waveform data at the burst fall respectively corresponding to the current elapsed time information for the Iα-coordinate of the current odd symbol timing opportunity and to the current elapsed time information for the Qα-coordinate are read alternately in time division from storage unit 112 with the timing of clock T6.

Both Iα- and Qα-coordinates are "0" with even symbol timing. Therefore, in the same way as the general transmission and burst rise, two kinds of the ramp waveform data at the burst fall at each elapsed time with input "0" are alternately read in time division from storage unit 112 every time the Lower address exceeds a certain value.

Storage unit 113 receives address signal Tc, which is input to storage units 112 and 113 simultaneously, as an address of two MSBs. Storage unit 113 prestores the outputs of coordinate accumulators 108 and 109, which are divided in time division with the timing of clock T6, as addresses of bits succeeding to the two MSBs, and receives clock T1, namely, elapsed time information sent from timing generating circuit 102 as lower addresses.

As shown in FIG. 7A, storage unit 113 has the same area assignment with addresses as storage unit 112. That is, in a storage area indicated by two-MSB address "00" in storage unit 112, waveform data of general transmission is stored; in a storage area indicated by two-MSB address "01," ramp waveform data at burst rise; and in a storage area indicated by two-MSB address "10," ramp waveform data at burst fall. The bits of each of the above waveform data respectively correspond to Iβ- and Qβ-coordinates that are input to the lowpass filter.

Storage unit 113 stores the following kinds of waveform data for general transmission: a $1/\sqrt{2}$ response waveform data of the lowpass filter, such as a root Nyquist filter, at the time when ±1, which are the values of Iβ- and Qβ-coordinates given with even symbol timing, is input to the lowpass filter; and a $1/\sqrt{2}$ response waveform data of the lowpass filter at the time when 0, which is the value of Iβ- and Qβ-coordinates given with odd symbol timing, is input to the lowpass filter.

Also, storage unit 113 stores the following kinds of ramp waveform data for burst rise: a $1/\sqrt{2}$ ramp waveform data for rise ramp processing at the time when either of ±1, which are the values of Iβ- and Qβ-coordinates given with even symbol timing, is input to the lowpass filter; and a $1/\sqrt{2}$ ramp waveform data for rise ramp processing at the time when 0, which is the value of Iβ- and Qβ-coordinates given with odd symbol timing, is input to the lowpass filter. That means storage unit 113 stores the ramp waveform data that is equal to the second and third terms in Formulae 10 and 11.

Furthermore, storage unit 113 stores the following kinds of ramp waveform data for burst fall: a $1/\sqrt{2}$ ramp waveform data for fall ramp processing at the time when either of ±1, which are the values of Iβ- and Qβ-coordinates given with even symbol timing, is input to the lowpass filter; and a $1/\sqrt{2}$ ramp waveform data for fall ramp processing at the time when 0, which is the value of Iβ- and Qβ-coordinates given with odd symbol timing, is input to the lowpass filter.

In a general transmission, address signal Tc is input as two-MSB address "00" to storage unit 113, and the succeeding higher bits divided in time division with the timing of clock T6 are input alternately from coordinate accumulators 108 and 109. The higher bits from coordinate accumulators 108 and 109 are updated with each even symbol timing opportunity. In parallel with these pieces of data, a lower address as clock T1 of elapsed time information is input to storage unit 113.

Coordinate accumulator 108 outputs Iβ-coordinates accumulated with even symbol timing to storage unit 113 as, for example, five higher bits succeeding to the two MSBs. The LSB of the five higher bits is the Iβ-coordinate of the current even symbol timing opportunity and the other four bits are Iβ-coordinates of the previous even timing opportunities, with "−1" represented by "0." According to these five higher bits, the $1/\sqrt{2}$ filter response waveform data corresponding to the current elapsed time information for the Iβ-coordinate of the current even symbol timing opportunity is read from storage unit 113, for example, with the odd timing of clock T6.

Coordinate accumulator 109 outputs Qβ-coordinates accumulated with even symbol timing to storage unit 113 as, for example, five higher bits succeeding to the two MSBs. Of the five higher bits, the LSB is the Qβ-coordinate of the current even symbol timing opportunity and the other four bits are Qβ-coordinates of the previous even timing opportunities, with "−1" represented by "0." According to these five higher bits, the $1/\sqrt{2}$ filter response waveform data corresponding to the current elapsed time information for the Qβ-coordinate of the current even symbol timing opportunity is read from storage unit 113, for example, with the even timing of clock T6.

With odd symbol timing, the address in storage unit 113 is not updated as no address is input from coordinate accumulators 108 and 109. However, clock T1 of elapsed time information indicates odd symbol timing. As has been described earlier, both Iβ- and Qβ-coordinates are "0" with odd symbol timing. Therefore, two kinds of the $1/\sqrt{2}$ filter response waveform data at each elapsed time with input "0" are read alternately in time division from storage unit 113 every time the Lower address exceeds a certain value.

The only difference between the rise ramp processing and the general transmission is that two-MSB address "01" given by address signal Tc is input to storage unit 113. The rise ramp processing is performed the same as the general transmission in terms of the rest of the processing, that is, addresses of higher bits succeeding to the two MSBs are input alternately from coordinate accumulators 108 and 109 to storage unit 113, and, in parallel, clock T1 as lower addresses.

Therefore, two kinds of the $1/\sqrt{2}$ ramp waveform data of the current elapsed time information with input "0" corresponding to Iβ- and Qβ-coordinates are read alternately in time division with the timing of clock T6 when the lower address given by clock T1 is less than a certain value. Also, the $1/\sqrt{2}$ ramp waveform data of the current elapsed time information with Iβ-coordinate input with the current even symbol timing is read, for example, with odd timing of clock T6. The $1/\sqrt{2}$ ramp waveform data of the current elapsed time information with Qβ-coordinate input with the current even symbol timing is read, for example, with even timing of clock T6.

The only difference between the fall ramp processing and the general transmission is that two-MSB address "10" given by address signal Tc is input to storage unit 113. The fall ramp processing is performed the same as the general transmission and rise ramp processing for the rest, that is, addresses of higher bits succeeding to the two MSBs are input from coordinate accumulators 108 and 109 to storage unit 113, and, in parallel, clock T1 as a lower address.

Therefore, the $1/\sqrt{2}$ ramp waveform data at the burst fall of the current elapsed time information with "0" input with the current odd symbol timing is read with the timing of clock T6 when the Lower address given by clock T1 is less than a certain value. The $1/\sqrt{2}$ ramp waveform data at the burst fall of the current elapsed time information with the Iβ-coordinate input with the current even symbol timing is read, for example, with odd timing of clock T6. The $1/\sqrt{2}$ ramp waveform data at the burst fall of the current elapsed time information with the Qβ-coordinate input with the current even symbol timing is read, for example, with even timing of clock T6.

Figure 8:
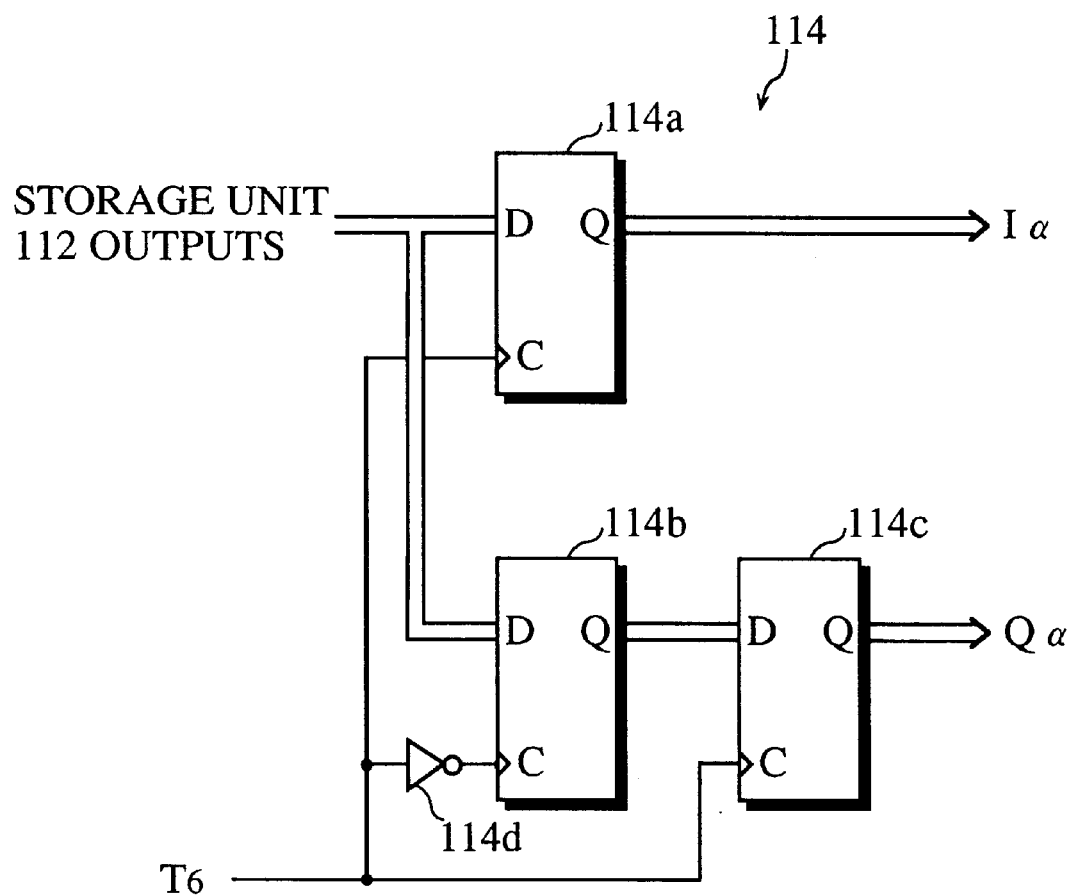
FIG. 8 shows a separating circuit.

Separating circuit 114 separates the output from storage unit 112 into the filter response waveform (or ramp waveform) data corresponding to Iα-coordinate and the filter response waveform (or ramp waveform) data corresponding to Qα-coordinate with the timing of clock T6 and outputs the two kinds of data simultaneously, for example, with the cycle of clock T1. More specifically, separating circuit 114 receives the filter response waveform data corresponding to Iα-coordinate, for example, with odd timing of clock T6 and outputs the data to adder 118 with the following even timing of the same clock T6. Also, separating circuit 114 receives and outputs the filter response waveform data corresponding to Qα-coordinate to adder 119, for example, with even timing of clock T6. FIG. 8 shows separating circuit 114 in detail. The drawing includes registers 114a–114c and inverter 114d. Note that a clock having a shorter synchronous cycle than clock T6 may be used for registers 114a–114c to shorten the delay.

Separating circuit 115 separates the output from storage unit 112 into the $1/\sqrt{2}$ filter response waveform (or ramp waveform) data corresponding to Iβ-coordinate and the $1/\sqrt{2}$ filter response waveform (or ramp waveform) data corresponding to Qβ-coordinate with the timing of clock T6 and outputs the two kinds of data simultaneously, for example, with the cycle of clock T1. More specifically, separating circuit 115 receives the $1/\sqrt{2}$ filter response waveform data corresponding to Iβ-coordinate, for example, with odd timing of clock T6 and outputs the data to subtracter 116 and adder 117 with the following even timing of the same clock T6. Also, separating circuit 115 receives and outputs the $1/\sqrt{2}$ filter response waveform data corresponding to Qβ-coordinate to subtracter 116 and adder 117, for example, with even timing of clock T6. Separating circuit 115 has the same construction as that shown FIG. 8.

Subtracter 116 subtracts the $1/\sqrt{2}$ filter response waveform data corresponding to Qβ-coordinate from the $1/\sqrt{2}$ filter response waveform data corresponding to Iβ-coordinate, both kinds of data being output from separating unit 115. That is, subtracter 116 executes the subtraction of the third term from the second term in Formula 8.

Adder 117 adds two kinds of data being output from separating unit 115, namely, two kinds of $1/\sqrt{2}$ filter response waveform data respectively corresponding to Iβ-coordinate and Qβ-coordinate. That is, adder 117 executes the addition of the second and third terms in Formula 9.

Adder 118 adds the output from subtracter 116 to the filter response waveform (or ramp waveform) data corresponding to Iα-coordinate, namely, one of the outputs from separating unit 114 to output instantaneous value I(t) of I-phase signal given by Formula 8.

Adder 119 adds the output from adder 117 to the filter response waveform (or ramp waveform) data corresponding to Qα-coordinate, namely, the other of the outputs from separating unit 114 to output instantaneous value Q(t) of Q-phase signal given by Formula 9.

D/A converting unit 120 converts digital data I(t) into an analog signal, I(t) being the output from adder 118 and representing the instantaneous value of the I-phase signal.

D/A converting unit 121 converts digital data Q(t) into an analog signal, Q(t) being the output from adder 119 and representing the instantaneous value of the Q-phase signal.

The above operations performed by subtracter 116 and adders 117–119 generate instantaneous value I(t) of I-phase signal and instantaneous value Q(t) of Q-phase signal which are used to generate corresponding ramp waveforms at the burst rise and fall. Also, the above operations generate instantaneous value I(t) of I-phase signal and instantaneous value Q(t) of Q-phase signal which correspond to the response waveforms of the lowpass filter at general transmissions.

Figure 9:
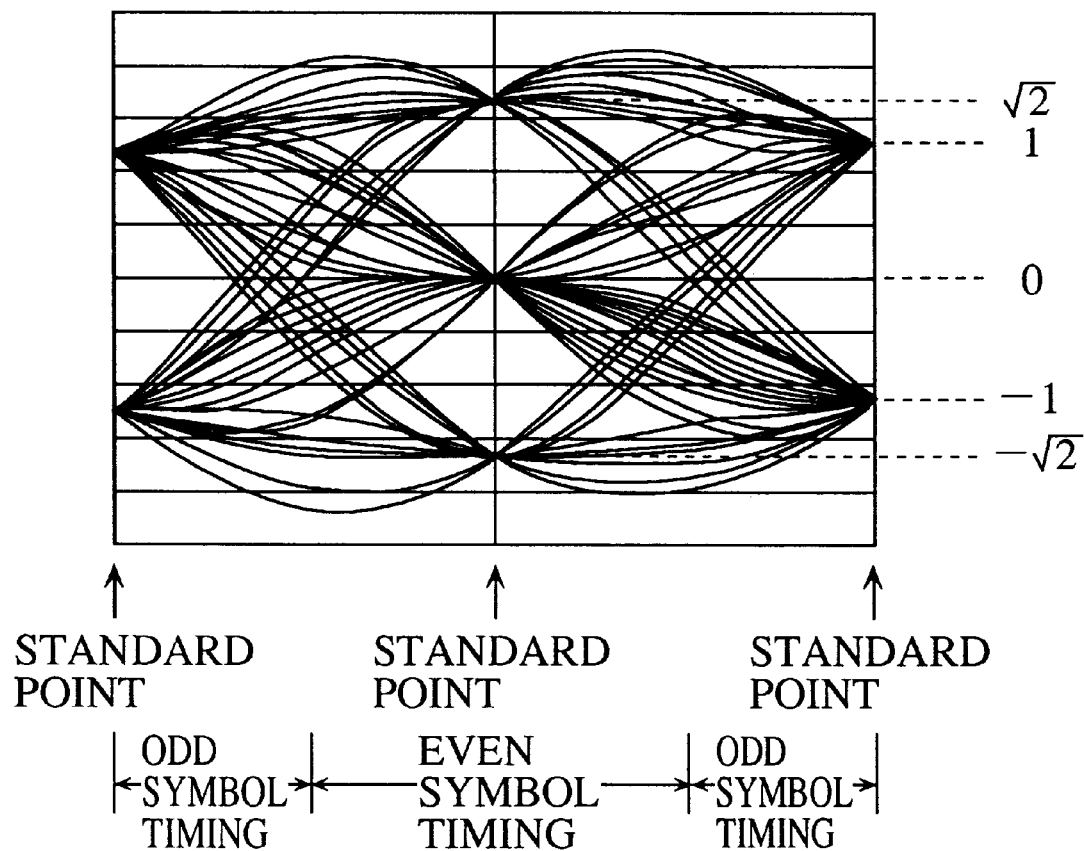
FIG. 9 shows eye patterns representing the waveforms output during two symbol periods (including even and odd) in a general transmission.

FIG. 9 shows eye patterns representing the waveforms output from D/A converters 120 and 121 during two symbol periods (including even and odd) in a general transmission. In the drawing, the horizontal axis shows the elapsed time, the vertical axis the output level of filter response waveform h(t) of I- and Q-phases. It is supposed that when filter input is 1 and interference between codes is 0, instantaneous value of base point is 1.

With even symbol timing, the levels of instantaneous values I(t) and Q(t) of the standard point are any of $+\sqrt{2}$, $-\sqrt{2}$, and 0 since the first terms in Formulae 8 and 9 may be "0" and at the same time the second and third terms may cancel each other out. When the second and third terms cancel each other out, either of I(t) and Q(t), namely, respective instantaneous values of I and Q phases, is level 0. For example, instantaneous value I(t) of I phase is level 0 for signal point E or G in FIG. 1. At the same time, instantaneous value Q(t) of Q phase is level $+\sqrt{2}$ for signal point E, level $-\sqrt{2}$ for signal point G.

With odd symbol timing, each level of instantaneous values I(t) and Q(t) of the standard point is either of +1 and −1 since the second and third terms are level 0 and each of Iα and Qα of the first term is either of +1 and −1. For example, instantaneous values I(t) and Q(t) of the standard point are level 1 for signal point A.

Mixer 122 mixes the output from D/A converter 120 and a carrier wave. The output from mixer 122 is represented by I(t)cos2 πfCt which is a result of multiplying I(t), the output from D/A converter 120, by carrier wave cos2 πfCt.

Mixer 123 mixes the output from D/A converter 121 and a carrier wave input via π/2 phase shifter 124. The output from mixer 123 is represented by Q(t)sin2 πfCt which is a result of multiplying Q(t), the output from D/A converter 121, by carrier wave sin2 πfCt having phase difference π/2.

π/2 phase shifter 124 delays the phase of input carrier waves by π/2.

Adder 125 multiplexes the outputs from mixers 122 and 123 and outputs the multiplexed value. Adder 125 outputs modulated signal I(t)cos2 πfCt+Q(t)sin2 πfCt which corresponds to a response waveform from the lowpass filter. Adder 125 outputs a certain ramp waveform as shown in FIG. 4 (c) MODULATED SIGNAL during the ramp period.

As apparent from the above description, this embodiment of the present invention has succeeded in reducing the number of storage units from four, as storage units 610–613 in conventional π/4-shift QPSK modulating apparatus 600, to two by reading the waveform data stored in storage units 112 and 113 with time division with clock T6 corresponding to I- and Q-coordinates. This reduces the number of circuits as a whole and makes it easier to achieve π/4-shift QPSK modulating apparatus 100 in an LSI chip.

Also, the reduction in the number of circuits makes it possible for storage units 112 and 113 to store the ramp waveform data at burst rise and burst fall enabling the ramp processing at the burst rise and burst fall. Furthermore, it is possible to generate the ramp waveform more accurately with the same procedure as that used in general transmissions by using the ramp waveform data stored in storage units 112 and 113.

In the present embodiment, the ramp waveform data is generated for each of the burst rise and burst fall and is stored in storage units 112 and 113. For the burst rise, one pattern of the ramp waveform data generated based on a certain piece of dummy data may be stored in each of storage units 112 and 113 since the substantial data has not been input yet and the data is not demodurated from the ramp waveform. Also, for the burst fall, one pattern of the ramp waveform data generated in advance may be stored in each of storage units 112 and 113 so that the ramp wave falls smoothly from the filter response waveform at general transmission. This is because there is no need of considering interferences response components which are generated by the previous inputs at general transmission. Even for the burst fall, the interference by response components by the inputs at general transmission would not be ignored if the ramp waveform were to be generated according to the response waveform from the actual filter. However, in reality, storage units 112 and 113 do not store such interferences but store the genuine waveform data which is read as response waveforms. Accordingly, storage space not so much as that required for storing the filter response waveform data at a general transmission is required even if the ramp waveform data for both burst rise and fall is stored.

In this embodiment of the present invention, the ramp waveform data is stored for both burst rise and burst fall. However, the ramp waveform data may not necessarily be stored for both burst rise and burst fall. For example, storage units 112 and 113 may store only ramp waveform data at burst rise. Alternatively, a counter for counting down the elapsed time, that is, with a reversed direction of clock T1, may be set so that at burst falls, the output from this counter is used as lower bits instead of clock T1 to read the ramp waveform of the burst rise.

Also, the ramp waveform of the modulated signal may be generated from the waveform data for general transmissions with dummy data input instead of being generated from the ramp waveform data. For example, amplitude adjustment circuits consisting of shift registers may be set at the outputs of adders 118 and 119 or at the outputs of storage units 112 and 113 so that at burst rises, lower bits of an input value are output in the beginning then the number of output bits is increased as the time elapses to generate the ramp waveform at the burst rise. Similarly, for the burst falls, the number of output bits may be decreased as the time elapses to generate the ramp waveform at the burst fall.

In this embodiment of the present invention, address signal Tc is used as two MSBs in the addresses of storage units 112 and 113. However, address signal Tc may not necessarily be used as a two-MSB address. Address signal Tc may be used as two bits succeeding to two MSBs in the addresses, the two s being the outputs from switching circuits 110 and 111 since the ramp waveform data does not require as much amount of data as the waveform data at general transmissions.

In this embodiment of the present invention, each of coordinate accumulators 106, 107, 108, and 109 accumulates, for example, five bits of coordinates. However, they may accumulate seven, ten, or other number of bits instead of five bits. That is, the number of bits accumulated by the accumulators may be determined based on the degree in which th e filter response to the earlier coordinate values affects the filter response to the later coordinate values as time elapses. Note that as the number of bits accumulated by accumulators 106, 107, 108, and 109 increases, the accuracy of the filter response waveform improves but the amount of data stored in storage units 112 and 113 increases.

In this embodiment of the present invention, a case with $\pi/4$-shift QPSK is described. However, QPSK may be used instead of $\pi/4$-shift QPSK. In that case, either of the two horizontal data flows shown in FIG. 3 may be used to achieve such an operation.

INDUSTRIAL USE POSSIBILITY

This invention is suitable for phase modulating apparatuses for allowing storage units to store the waveform data of I- and Q-components of the symbol data in advance and generating the symbol waveform according to the waveform data. This invention is also suitable for simplifying circuits since the transmission amplifier need not perform a gain control since the reduction in the capacity of the storage unit enables the storage of the waveform data used in the ramp processing around the burst transmission in the storage unit with other waveforms.

What is claimed is:

1. A phase modulating apparatus comprising: storage means for storing waveform data including a waveform used for rise ramp processing, a plurality of phase waveforms used for both I-component and Q-component of a plurality of transmission symbols, and a waveform used for fall ramp processing;

converting means for converting each of a dummy symbol for the rise ramp processing, the plurality of transmission symbols, and a dummy symbol for the fall ramp processing into the I-component and the Q-component, wherein the dummy symbol for the rise ramp processing, the plurality of transmission symbols, and the dummy symbol for the fall ramp processing are provided in time series;

address providing means for providing alternately during one symbol period the I-component and the Q-component converted by the converting means as addresses of the storage means;

separating means for fetching an I-component waveform and a Q-component waveform which are read alternately from the storage means and outputting simultaneously the I-component waveform and the Q-component waveform; and combining means for combining the I-component waveform and the Q-component waveform output from the separating means into a symbol waveform.

2. The phase modulating apparatus of claim 1, wherein the address providing means comprises:

timing generating means for generating first timing information which indicates a rise ramp processing section, a transmission section, and a fall ramp processing section and second timing information which indicates the symbol period used in each of the rise ramp processing section, the transmission section, and the fall ramp processing section;

selecting means for selecting alternately during one symbol period the I-component and the Q-component converted by the converting means according to the second timing information; and inputting means for inputting an address into the storage means, wherein the address includes a first partial address, which is the first timing information, and second partial address, which is an output from the selecting means.

3. The phase modulating apparatus of claim 2, wherein the address providing means further comprises:

I-shift register for accumulating I-components of a certain number of symbols converted by the converting means and outputting the I-components in parallel; and Q-shift register for accumulating Q-components of the certain number of symbols converted by the converting means and outputting the Q-components in parallel, wherein the selecting means selects alternately an output from the I-shift register and an output from the Q-shift register.

4. The phase modulating apparatus of claim 1, wherein the separating means comprises:

first delay means for delaying the I-component waveform output from the storage means; and second delay means for delaying the Q-component waveform output from the storage means so that the second delay means is synchronized with the first delay means in outputting.

5. A $\pi/4$-shift QPSK modulating apparatus for assigning uniquely a signal point on a two-dimensional coordinate, which has an I-axis and a Q-axis perpendicular to one another, for each set of sequential two bits in serial data input and generating a modulated signal corresponding to a response waveform which is output from a lowpass digital filter at a time when an I-coordinate and a Q-coordinate of the signal point is input, the $\pi/4$-shift QPSK modulating apparatus comprising:

I-coordinate accumulating means for accumulating the I-coordinate and outputting accumulated I-coordinates;

Q-coordinate accumulating means for accumulating the Q-coordinate and outputting accumulated Q-coordinates;

ramp period notifying means for outputting a ramp period notification signal which indicates a burst rise period for ramp processing, a burst transmission period during which a modulated signal representing transmission data is transmitted, and a burst fall period for ramp processing;

clock means for outputting time information and a switch signal, wherein the time information, having a frequency higher than input data, indicates a certain elapsed time, and the switch signal is faster than the time information;

switching means for selecting alternately an output from the I-coordinate accumulating means and an output from the Q-coordinate accumulating means according to the switch signal and outputting a selected output;

rise ramp means for outputting alternately a burst rise ramp waveform for an I-coordinate filter input and a burst rise ramp waveform for a Q-coordinate filter input according to the ramp period notification signal, an output from the switching means, and the time information;

filter means for outputting alternately a filter response waveform for an I-coordinate input and a filter response waveform for a Q-coordinate input according to the ramp period notification signal, an output from the switching means, and the time information;

fall ramp means for outputting alternately a burst fall ramp waveform for an I-coordinate filter input and a burst fall ramp waveform for a Q-coordinate filter input according to the ramp period notification signal, an output from the switching means, and the time information; and separating means for separating each output from the rise ramp means, the filter means, and the fall ramp means into two streams which respectively correspond to the I-coordinate and the Q-coordinate.

6. The π/4-shift QPSK modulating apparatus of claim 5, wherein the I-coordinate accumulating means comprises:

odd I-coordinate accumulating means for accumulating I-coordinates of odd signal points in the serial data input and outputting an I-coordinate sequence including a certain number of accumulated I-coordinates; and even I-coordinate accumulating means for accumulating I-coordinates of even signal points in the serial data input and outputting an I-coordinate sequence including the certain number of accumulated I-coordinates, wherein the Q-coordinate accumulating means comprises:

odd Q-coordinate accumulating means for accumulating Q-coordinates of odd signal points in the serial data input and outputting an Q-coordinate sequence including the certain number of accumulated Q-coordinates; and even Q-coordinate accumulating means for accumulating Q-coordinates of even signal points in the serial data input and outputting an Q-coordinate sequence including the certain number of accumulated Q-coordinates, wherein the switching means comprises:

odd switching means for selecting alternately an output from the odd I-coordinate accumulating means and an output from the odd Q-coordinate accumulating means according to the switch signal and outputting a selected output; and even switching means for selecting alternately an output from the even I-coordinate accumulating means and an output from the even Q-coordinate accumulating means according to the switch signal and outputting a selected output, wherein the rise ramp means, the filter means, and the fall ramp means include an odd storage unit and an even storage unit, wherein the odd storage unit stores response waveform data of a digital filter and also stores burst rise ramp waveform data and burst fall ramp waveform data which each correspond to the response waveform data of the digital filter, wherein the response waveform data of the digital filter corresponds to an I-coordinate and a Q-coordinate which are determined by two bits at odd input data which is indicated by addresses, namely, the ramp period notification signal, an output from the switching means, and the time information, wherein the even storage unit stores response waveform data of a digital filter and also stores burst rise ramp waveform data and burst fall ramp waveform data which each correspond to the response waveform data of the digital filter, wherein the response waveform data of the digital filter corresponds to an I-coordinate and a Q-coordinate which are determined by two bits at even input data which is indicated by addresses, namely, the ramp period notification signal, an output from the switching means, and the time information.

* * * * *